United States Patent
Chen et al.

(10) Patent No.: US 10,072,530 B2
(45) Date of Patent: Sep. 11, 2018

(54) HYBRID POWER GENERATION SYSTEM USING SOLAR ENERGY AND BIOENERGY

(71) Applicant: WUHAN KAIDI ENGINEERING TECHNOLOGY RESEARCH INSTITUTE CO., LTD., Wuhan (CN)

(72) Inventors: Yilong Chen, Wuhan (CN); Yanfeng Zhang, Wuhan (CN); Wenyan Liu, Wuhan (CN)

(73) Assignee: WUHAN KAIDI ENGINEERING TECHNOLOGY RESEARCH INSTITUTE CO., LTD., Wuhan (CN)

( * ) Notice: Subject to any disclaimer, the term of this patent is extended or adjusted under 35 U.S.C. 154(b) by 0 days.

(21) Appl. No.: 15/289,992

(22) Filed: Oct. 11, 2016

(65) Prior Publication Data

US 2017/0030226 A1    Feb. 2, 2017

Related U.S. Application Data

(63) Continuation-in-part of application No. PCT/CN2015/072398, filed on Feb. 6, 2015.

(30) Foreign Application Priority Data

Apr. 11, 2014    (CN) .......................... 2014 1 0144032

(51) Int. Cl.
*F02C 6/00* (2006.01)
*F01D 15/10* (2006.01)
(Continued)

(52) U.S. Cl.
CPC ................ *F01K 3/18* (2013.01); *F01D 15/10* (2013.01); *F01K 11/02* (2013.01); *F03G 6/06* (2013.01);
(Continued)

(58) Field of Classification Search
CPC . F01K 3/18; F01K 11/02; F01D 15/10; F03G 6/06
(Continued)

(56) References Cited

U.S. PATENT DOCUMENTS 8,661,819 B2 *    3/2014  Schubert ................. C02F 1/048
                                                           60/648
9,151,277 B2 *   10/2015  Yang ........................ F01K 7/22
(Continued)

FOREIGN PATENT DOCUMENTS

CN           101787906 A  *  7/2010

OTHER PUBLICATIONS

Machine translation of CN101787906, obtained via ESPACE.net.*

*Primary Examiner* — Tulsidas C Patel
*Assistant Examiner* — Thomas Quigley
(74) *Attorney, Agent, or Firm* — Matthias Scholl P.C.; Matthias Scholl

(57) ABSTRACT

A hybrid power generation system using solar energy and bioenergy, including a solar thermal boiler system, a biomass boiler system, and a turbogenerator system. The solar thermal boiler system includes a trough solar collector, a heat collector, an oil circulating pump, a storage tank for storing heat transfer oil, a solar thermal heater, a solar thermal evaporator, a main pipe transporting saturated steam, and an auxiliary boiler. Heat transfer oil output from a solar light field of the solar thermal boiler system is transmitted through and transfers heat to the solar thermal evaporator and the solar thermal heater, and the heat transfer oil returns to the storage tank for storing heat transfer oil. The heat transfer oil in the storage tank is pumped to the solar light field via the oil circulating pump.

12 Claims, 1 Drawing Sheet

(51) Int. Cl.
*F01K 3/18* (2006.01)
*F03G 6/06* (2006.01)
*F03G 7/00* (2006.01)
*F01K 11/02* (2006.01)
*H02K 7/18* (2006.01)

(52) U.S. Cl.
CPC ............. *F03G 7/00* (2013.01); *H02K 7/1823* (2013.01); *F05D 2210/12* (2013.01); *F05D 2220/75* (2013.01); *F05D 2220/76* (2013.01); *Y02E 10/46* (2013.01)

(58) Field of Classification Search
USPC .......................................................... 290/52
See application file for complete search history.

(56) References Cited

U.S. PATENT DOCUMENTS

| | | | | |
|---|---|---|---|---|
| 9,657,972 B2* | 5/2017 | Chen | ..................... | F24D 11/003 |
| 2005/0279095 A1* | 12/2005 | Goldman | ................ | F01K 13/00 |
| | | | | 60/641.8 |
| 2007/0012041 A1* | 1/2007 | Goldman | ................ | F01K 13/00 |
| | | | | 60/641.8 |
| 2008/0127647 A1* | 6/2008 | Leitner | ................... | F02C 1/007 |
| | | | | 60/645 |
| 2013/0219890 A1* | 8/2013 | Majima | ...................... | F24J 2/14 |
| | | | | 60/641.15 |

* cited by examiner

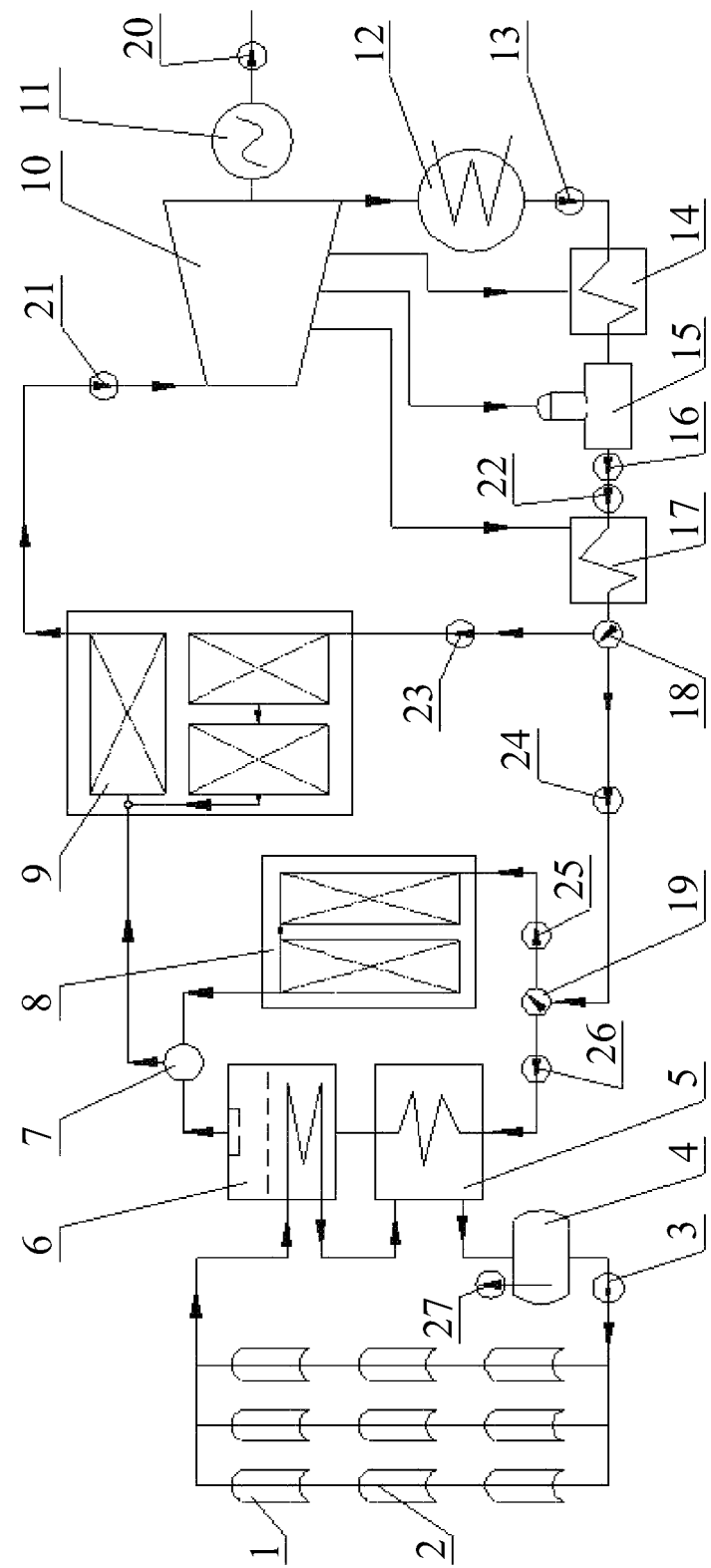

HYBRID POWER GENERATION SYSTEM USING SOLAR ENERGY AND BIOENERGY

CROSS-REFERENCE TO RELATED APPLICATIONS

This application is a continuation-in-part of International Patent Application No. PCT/CN2015/072398 with an international filing date of Feb. 6, 2015, designating the United States, now pending, and further claims priority benefits to Chinese Patent Application No. 201410144032.9 filed Apr. 11, 2014. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention

The invention relates to a hybrid power generation system using solar energy and bioenergy.

Description of the Related Art

Conventional trough-type solar energy power generation systems are structurally complex, inefficient, unstable, and costly, and many of their technical parameters leave much to be desired.

SUMMARY OF THE INVENTION

In view of the above-described problems, it is one objective of the invention to provide a hybrid power generation system using solar energy and bioenergy.

The system integrates the solar thermal boiler and the biomass boiler to generate electricity, and the configurations of the solar thermal power generation system and device are simplified. The system integrating light-gathering, heat collection, light-heat conversion, and auxiliary boiler which are parallel and complementary, effectively solves the problem of the intermittent and instable solar energy supply. The system uses low-cost fuel coal, thus the power plant does not need to rely on the high-quality natural gas resources and the gas supply network. In addition, the combination of solar energy and bioenergy facilitates the scale expansion of installation capacity and improves the economic benefits and the environmental protection benefits of the power plant.

To achieve the above objective, in accordance with one embodiment of the invention, there is provided a hybrid power generation system using solar energy and bioenergy comprising a solar thermal boiler system, a biomass boiler system, and a turbogenerator system. The solar thermal boiler system comprises a trough solar collector, a heat collector, an oil circulating pump, a storage tank for storing heat transfer oil, a solar thermal heater, a solar thermal evaporator, a main pipe transporting saturated steam, an auxiliary boiler. The turbogenerator system comprises a turbine, a generator, a condenser, a condensate pump, a first heater, a deaerator, a feed water pump, and a second heater. High-temperature heat transfer oil output by a solar light field of the solar thermal boiler system is transmitted through and transfers heat to the solar thermal evaporator and the solar thermal heater, then returns to the storage tank for storing heat transfer oil. The low-temperature heat transfer oil in the storage tank is transmitted to the solar light field via the oil circulating pump, thus an oil circulation is completed, meanwhile achieving heat transmission and transfer. Steam generated at the solar thermal evaporator passes through the main pipe transporting saturated steam and is transmitted to the biomass boiler system. The auxiliary boiler is parallel to the solar thermal evaporator and the solar thermal heater, and is adapted to generate auxiliary steam. The auxiliary steam passes through the main pipe, mixes with the steam generated at the solar thermal evaporator, and enters the biomass boiler system. Mixed steam and steam generated by a biomass boiler are superheated in the biomass boiler system to 540° C.±5° C. The superheated steam is transmitted to the turbine, expands in the turbine, and drives the generator to generate electricity. Waste steam of the turbine is connected to the condenser and is condensed to be a condensate which is collected in a condensate tank. The condensate is pressurized by the condensate pump and is transmitted to the first heater in which the condensate is heated and is transmitted to the deaerator to produced feed water. The feed water output from the deaerator is pumped to the second heater to be heated via the feed water pump. A heating temperature in the second heater is 240° C.±5° C. Then the feed water is distributed by a first flow distributor to be two parts: first part of the feed water is transmitted to the biomass boiler system to produce steam, and second part of the feed water is transmitted to the solar thermal boiler system. The second part of the feed water is then distributed to be part A and part B. The part A is transmitted to the solar thermal heater, and the part B is transmitted to the auxiliary boiler. A second flow distributor is adapted to adjust a feed water flow ratio of part A to part B according to an intensity of solar energy. The second part of the feed water which enters the solar thermal boiler system is used to produce saturated steam, thus a circulation of working medium is completed.

In a class of this embodiment, the solar thermal evaporator and the auxiliary boiler both produce ultra-high pressure or high pressure saturated steam with a pressure of between 9.81 and 13.7 Megapascal and a temperature being 540° C.±5° C. A peak efficiency of solar thermal power generation is between 25% and 30%.

In a class of this embodiment, a temperature of the heat transfer oil output from the solar light field is below 380° C., in case of aging or deterioration of the heat transfer oil. The heat transfer oil which returns the storage tank is 280° C.±10° C.

In a class of this embodiment, the pressure of the saturated steam generated by the solar thermal evaporator is the same as pressure the saturated steam generated by the auxiliary boiler.

In a class of this embodiment, the auxiliary steam generated by the auxiliary boiler is complementary with the steam generated by the solar thermal evaporator. An adjustable load range of the auxiliary boiler is between 30% and 100%, and a total amount of mixed saturated steam is constant.

In a class of this embodiment, the biomass boiler system is adapted to generate steam and superheat other saturated steam. The biomass boiler comprises only 70% of an original furnace volume. The biomass boiler works to achieve 70% of biomass fuel combustion, 55% of feed water heating and evaporation, and 100% of steam superheating.

In a class of this embodiment, the feed water output from the second heater is distributed by a first flow distributor to be two parts: the first part of the feed water is transmitted to the biomass boiler system, accounting for 55% of the feed water; and the second part of the feed water is transmitted to the solar thermal boiler system, accounting for 45% of the feed water. The flow ratio of the first part to the second part is fixed. The second part of the feed water is then distributed by the second flow distributor to be the part A and the part B. The part A is transmitted to the solar thermal heater, and the part B is transmitted to the auxiliary boiler. The second flow distributor is adapted to adjust the feed water flow ratio of part A to part B according to a temperature of the heat transfer oil returning to the storage tank.

In a class of this embodiment, the solar light field comprises an oil temperature detection and protection device. When the return oil temperature is above 300° C. or when the heat transfer oil leaving the solar light field is above 380° C., the oil temperature detection and protection device is actuated to unload a part of irradiation; when the heat transfer oil returning to the storage tank is decreased to 200° C., a storage tank heater is actuated to constantly heat the heat transfer oil, thus avoiding solidification of the heat transfer oil and protecting devices in the solar light field from frost damage.

Advantages of the hybrid power generation system using solar energy and bioenergy according to embodiments of the invention are summarized as follows:

1. The hybrid power generation system utilizes solar energy and bioenergy for power generation with high parameters and has high power generation efficiency.
2. The system integrates the solar thermal boiler and the biomass boiler to generate electricity. No heat storage device is used, thus the configurations of power generation system and devices are simplified, and the costs are saved.
3. The auxiliary boiler is parallel to and complementary with the solar thermal boiler which uses fluctuant and intermittent solar energy; the portion of which is reasonably arranged, thus the yield of the saturated steam is stable, and the intermittent and instable solar energy supply problem is effectively solved.
4. Compared with the system using solar energy in the turbine regenerative system, the system in the invention involves in working medium heating and evaporation process, thus realizing cascade utilization of solar energy, and the heat utilizing efficiency is high.
5. The maximum contribution rate of the auxiliary boiler is 30%. The system uses low-cost fuel coal as auxiliary heat source, thus the power plant does not rely on the high-quality natural gas resources and the gas supply network, and the energy policy that the blending heat portion of fuel coal in the bioenergy is no higher than 20% is satisfied.
6. The combination of solar energy and bioenergy facilitates the scale expansion of installation capacity and improves the economic benefit and the environmental protection benefit of the power plant.
7. The auxiliary steam is saturated steam which can adapt to drastic change of solar energy. The adjustable load range of the auxiliary boiler is between 30% and 100%. The steam generated by the solar thermal evaporator is saturated steam which is coordinated with the auxiliary steam, facilitating the control of the upper limit temperature of heat transfer oil, and prolongs the service life of the heat transfer oil.
8. The mixed saturated steam is transmitted to the biomass boiler system to be superheated to 540° C., so as to meet the high parameters requirements of the steam turbine.

BRIEF DESCRIPTION OF THE DRAWINGS

The invention is described hereinbelow with reference to accompanying drawings, in which the sole FIGURE is a flow chart and a schematic view of main devices of a hybrid power generation system using solar energy and bioenergy of an exemplary embodiment of the invention.

In the drawings, the following reference numbers are used: 1. Trough solar collector; 2. Heat collector; 3. Oil circulating pump; 4. Storage tank for storing heat transfer oil; 5. Solar thermal heater; 6. Solar thermal evaporator; 7. Main pipe transporting saturated steam; 8. Auxiliary boiler; 9. Biomass boiler system; 10. Turbine; 11. Generator; 12. Condenser; 13. Condensate pump; 14. First heater; 15. Deaerator; 16. Feed water pump; 17. Second heater; 18. First flow distributor; 19. Second flow distributor; 20. Power supply load; 21. First flowmeter: steam consumption f1; 22. Second flowmeter: total amount of feed water f2; 23. Third flowmeter: feed water flow f3; 24. Fourth flowmeter: feed water flow f4; 25. Fifth flowmeter: feed water flow f5; 26. Sixth flowmeter: feed water flow f6; and 27. Thermometer: return oil temperature t.

DETAILED DESCRIPTION OF THE EMBODIMENTS

For further illustrating the invention, experiments detailing a hybrid power generation system using solar energy and bioenergy are described below. It should be noted that the following examples are intended to describe and not to limit the invention.

As shown in FIG. 1, a hybrid power generation system using solar energy and bioenergy comprising a solar thermal boiler system, a biomass boiler system, and a turbogenerator system. Specifically, the solar thermal boiler system comprises a trough solar collector 1, a heat collector 2, an oil circulating pump 3, a storage tank 4 of heat transfer oil, a solar thermal heater 5, a solar thermal evaporator 6, a main pipe 7 of saturated steam, an auxiliary boiler 8 and other parts.

The light gathering and heat collection process: the trough solar collector 1 is integrated with the heat collector 2 to form a unit, and a plurality of units are connected in parallel or in series to form a solar light field which is adapted to collect solar energy, gather light, and perform light-heat conversion.

Heat transmission and heat transfer process: the heat transfer oil as the heat collecting medium is transmitted from the storage tank 4 to the light field at a temperature of 280° C. via the oil circulating pump 3. The heat transfer oil absorbs heat and is heated to about 380° C. at the light field, then the heat transfer oil is output from the light field and enters the solar thermal evaporator 6 first in which the heat transfer oil transfers heat to saturated water. The heat transfer oil is then output from an outlet of the solar thermal evaporator 6 and is connected to the solar thermal heater 5 in which the heat transfer oil transfers oil to the feed water and the temperature of the oil is decreased to 280° C. The heat transfer oil is returned to the storage tank 4, and the circulation of heat transfer oil is completed. The feed water is distributed via the second flow distributor 19, and a part of feed water enters the solar thermal heater 5 and absorbs the heat of the heat transfer oil, thus is heated to be saturated water. The saturated water is connected to the solar thermal evaporator 6 and absorbs the heat of the heat transfer oil, thus is evaporated and steam is produced. The steam as part of the saturated steam is connected to the main pipe 7 and is mixed with the auxiliary saturated steam.

Auxiliary steam production process: the other part of feed water distributed by the second flow distributor 19 flows to the auxiliary boiler 8, in which the feed water is heated, and is evaporated to be the auxiliary saturated steam. The auxiliary saturated steam is transmitted to the main pipe 7 and is mixed with the steam generated by the solar thermal evaporator, and the mixed steam is transmitted to the biomass boiler system 9 to be superheated.

The biomass boiler system 9 comprises a combustion device, an economizer, an evaporator, a superheater. The biomass boiler is adapted to produce certain amount of steam, and superheat the mixed saturated steam from the solar thermal boiler to about 540° C., so as to meet the requirements of the steam turbine with high parameters.

The turbogenerator system comprises a turbine 10, a generator 11, a condenser 12, a condensate pump 13, a first heater 14, a deaerator 15, a feed water pump 16, and a second heater 17. The qualified superheated steam output from the biomass boiler system 9 is connected to the turbine 10 and is adapted to expand in the turbine 10 and drive the generator 11 to generate electricity. Waste steam is connected to the condenser 12 in which the waste steam releases heat and is condensed to be a condensate which is collected in a condensate tank. The condensate is pressurized by the condensate pump 13 and is transmitted to the first heater 14 in which the condensate is heated and is transmitted to the deaerator 15 to produced feed water. The deaerator 15 removes the dissolved oxygen and other gas in the feed water by extraction and heating using low-pressure cylinder. The feed water output from the deaerator 15 is pumped to the second heater 17 to be heated to be between 215° C. and 240° C. via the feed water pump 16. Then the feed water is distributed by a first flow distributor 18 to be two parts: first part of the feed water is transmitted to the economizer of the biomass boiler system 9, and second part of the feed water is transmitted to the solar thermal boiler system, thus a circulation of working medium is completed. The flow ratio of the first part to the second part is constant. The second part of the feed water is then distributed to be part A and part B. The part A is transmitted to the solar thermal heater 5, and the part B is transmitted to the auxiliary boiler 8. A feed water flow ratio of part A to part B is adjusted according to an intensity of solar energy and the steam yield of the solar thermal evaporator.

The power generation proportion of the solar thermal boiler is 30%, and the power generation proportion of the biomass boiler system is 70%. Specifically, the power generation proportion is equivalent to the heat output proportion.

The solar thermal boiler system comprises the solar light field, a heat exchanger, and the auxiliary boiler. The solar light field is connected to the heat exchanger. The heat exchanger and the auxiliary boiler are both connected to the main pipe transporting saturated steam. The solar light field comprises certain amount of trough solar collectors 1 and the heat collectors 2. The trough solar collectors and the heat collectors are parallel or in series. The trough collector 1 is adapted to project the collected solar radiation energy on the heat collector 2, and the heat collector 2 is adapted to convert the solar radiation energy to thermal energy and heat the heat transfer oil to about 380° C. The heat transfer oil transfers heat to the feed water in the heat exchanger, and the steam is produced. The steam as a part of the saturated steam is connected to the main pipe 7.

The heat exchanger comprises the solar thermal heater 5 and the solar thermal evaporator 6. The solar thermal evaporator 6 is connected to an outlet of the solar light field. A heat transfer oil pipeline passes through the solar thermal evaporator 6 and the solar thermal heater 5. A low-temperature heat transfer oil outlet of the solar thermal heater 5 is connected to the storage tank 4. The low-temperature heat transfer oil is pumped from the storage tank 4 to the solar light field to absorb heat via the oil circulating pump 3, thus a circulation of the heat transfer oil is completed. The feed water as the working medium absorbs heat transferred by the heat transfer oil in the solar thermal heater 5, and is heated to be saturated water. The saturated water is connected to the solar thermal evaporator 6 in which the saturated water absorbs heat and is evaporated to be saturated steam. An outlet of saturated steam is connected to the main pipe 7.

Because the solar radiation changes over time and over day and night, the steam generated using solar energy also changes. In view of this, the auxiliary boiler 8 is provided in the invention. The auxiliary boiler generates the auxiliary steam which has the same pressure as the steam generated by the solar thermal evaporator. The auxiliary steam is mixed with the steam generated by the solar thermal evaporator in the main pipe 7, and the mixed steam is transmitted to the biomass boiler system 9 to be superheated. When the sunlight is weak, and the steam generated by the solar thermal evaporator decreases, the combustion in the auxiliary boiler 8 is intensified, thus the auxiliary steam is increased, and vice versa. The total amount of saturated steam is constant.

The auxiliary boiler 8 is a saturated steam boiler, and the steam pressure is corresponding to the pressure of the steam generated by the solar thermal evaporator and the pressure of the biomass boiler system. The maximum contribution rate of the auxiliary boiler is 30%.

The specific structure and the heat distribution of the biomass boiler are different from the conventional boiler. The biomass boiler comprises only 70% of an original furnace volume. The biomass boiler works to achieve 70% of biomass fuel combustion, 55% of feed water heating and evaporation, and 100% of steam superheating.

The flow distribution process of the feed water: the power supply load 20 decides the steam consumption f1 of the system, and the total amount of feed water f2 is determined. The first flow distributor 18 is adapted to detect and calculate the feed water flow f2, f3, and f4, and the valve opening of the first flow distributor 18 is regulated, so that the feed water flow ratio f3:f4 is kept at 55:45. The second part of the feed water is then distributed to be part A and part B by the second flow distributor 19. The part A is transmitted to the solar thermal heater, and the part B is transmitted to the auxiliary boiler 8. A feed water flow ratio of part A to part B is adjusted according to an intensity of solar energy. Specifically, the valve opening is regulated according to the return oil temperature t in the storage tank 4; when t rises, the feed water flow f6 is increased, and the feed water flow f5 is reduced; when t gets lower, the feed water flow f6 is reduced, and the feed water flow f5 is increased.

The solar light field comprises an oil temperature detection and protection device. At noon, the solar radiation is strong, and the feed water flow f6 is maximized (f5=0); when the return oil temperature t is above 300° C. or when the heat transfer oil leaving the solar light field is above 380° C., the oil temperature detection and protection device is actuated to adjust the incident angle of sunlight and unload a part of irradiation, thus the return oil temperature t becomes normal; rainy days and winter nights are lack of solar radiation, and the feed water flow f6 is decreased to 0; when return oil temperature t is decreased to 200° C., a storage tank heater is actuated to constantly heat the heat transfer oil, thus avoiding solidification of the heat transfer oil and protecting devices in the solar light field from frost damage.

The steam generated by the solar thermal boiler is not directly superheated in the biomass boiler because the steam generated by the solar thermal boiler is affected by the solar radiation which is fluctuant, instable, and even stopped at nights or rainy days. The power boiler with high parameters has a normal variable load range of between 70% and 100%, thus the biomass boiler cannot adapt to the changes in working conditions; in addition, the superheating of instable external steam is technically different from the boiler load change, because the heat distribution rate of the original boiler is changed, and the heating surface configuration is regulated. Therefore, the boiler cannot restore the original working condition when no steam is generated by the solar thermal evaporator as lacking of solar radiation since the heating surface is regulated. Thus the steam generated by the solar thermal boiler is not directly connected to the biomass boiler. In view of this, the auxiliary boiler is provided in the invention. The saturated steam boiler is used because the boiler can adapt to great solar energy variation. The adjustable range of the boiler is between 30% and 100% when the load (steam) is guaranteed and the steam temperature is not. The auxiliary boiler can be used as a substitution when lacking in solar energy, and the basic load of the biomass boiler system is not changed. The complex combination in the prior art is not needed in the invention.

The high parameters of the power generation system refer to that the main steam pressure is ultra-high pressure 13.7 Megapascal or high pressure 9.81 Megapascal. The main steam temperature is 540° C., thus ensuring the power generation efficiency to be relatively high.

To achieve the objective in the invention, the power generation system with high temperature and ultra-high pressure (13.7 Megapascal; 540° C.) or with high temperature and high pressure (9.81 Megapascal; 540° C.) is based on the biomass power generation platform. The system integrates the solar thermal boiler and the biomass boiler to generate electricity. In terms of the temperature characteristics of the solar trough system and the problem that the steam produced by the solar energy system cannot directly connected to the biomass boiler, the fluctuant and intermittent solar energy is complementary with the auxiliary boiler in the invention to produce stable saturated steam. The saturated steam is transmitted to the biomass boiler system and is heated to 540° C., so as to meet the requirements of the steam turbine with high parameters. The integration technology in the invention effectively solves the low temperature and the intermittent and instable solar energy supply problem of the solar trough system. The system in the invention uses a modern thermal power generation system with high parameters which is adapted to improve the solar thermal power generation efficiency. The configurations of the solar thermal power generation system and device are simplified. The system uses low-cost fuel coal, thus the power plant does not rely on the high-quality natural gas resources and the gas supply network. In addition, the combination of solar energy and bioenergy facilitates the scale expansion of installation capacity and improves the economic benefit and the environmental protection benefit of the power plant.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A hybrid power generation system, comprising:
a solar thermal boiler system, the solar thermal boiler system comprising a trough solar collector, a heat collector, an oil circulating pump, a storage tank for storing heat transfer oil, a solar thermal heater, a solar thermal evaporator, a main pipe transporting saturated steam, an auxiliary boiler, and a first flow distributor;
a biomass boiler system; and
a turbogenerator system, the turbogenerator system comprising a turbine, a generator, a condenser, a condensate pump, a first heater, a deaerator, a feed water pump, and a second heater;
wherein:
the trough solar collector is integrated with the heat collector to form a unit, and a plurality of units are connected in parallel or in series to form a solar light field for collecting solar energy and transforming the solar energy into heat carried by the heat transfer oil;
the solar light field is connected to the solar thermal evaporator and the solar thermal heater;
the oil circulating pump is adapted to pump the heat transfer oil in the storage tank to the solar light field;
the solar thermal evaporator is adapted to generate a solar thermal steam by the heat carried by the heat transfer oil;
the auxiliary boiler is parallel to the solar thermal evaporator and the solar thermal heater, and is adapted to generate an auxiliary steam by utilizing heat transformed from an auxiliary heat source instead of the solar energy;
the auxiliary boiler and the solar thermal evaporator are connected to the main pipe, and the main pipe is adapted to mix the solar thermal steam and the auxiliary steam respectively generated by the solar thermal evaporator and the auxiliary boiler into a mixed steam;
a flow of the mixed steam is constant, and a flow ratio of the solar thermal steam to the auxiliary steam is adjustable;
the first flow distributor is connected to the main pipe via the solar thermal heater, the solar thermal evaporator, and the auxiliary boiler;
the first flow distributor is adapted to adjust the flow ratio of the solar thermal steam to the auxiliary steam according to an intensity of the solar energy;
the main pipe is connected to the biomass boiler system; the biomass boiler system is adapted to produce a biomass steam, and superheat the mixed steam output from the solar thermal boiler system and the biomass steam into a superheated steam;
a flow of the biomass steam is constant;
the turbine is connected to the biomass boiler system for receiving the superheated steam, and the generator is connected to the turbine; the superheated steam expands in the turbine and drives the generator to generate electricity;
the turbine is connected to the condenser; the condenser is adapted to condense waste steam of the turbine to be a condensate;
the condensate is pressurized by the condensate pump, and the condensate pump is connected to the first heater; the first heater is adapted to heat the condensate, and the first heater is connected to the deaerator to produce a feed water; the feed water output from the deaerator is pumped to the second heater via the feed water pump; the second heater is adapted to heat the feed water; and when in use, the heat transfer oil output from the solar light field of the solar thermal boiler system is transmitted through and transfers heat to the solar thermal evaporator and the solar thermal heater, and the heat transfer oil returns to the storage tank; the heat transfer oil in the storage tank is pumped to the solar light field via the oil circulating pump; the solar thermal steam generated at the solar thermal evaporator is transmitted through the main pipe transporting saturated steam to the biomass boiler system; the auxiliary steam is transmitted through the main pipe in which the auxiliary steam is mixed with the solar thermal steam generated at the solar thermal evaporator to the biomass boiler system; the mixed steam and the biomass steam generated by the biomass boiler system are superheated to 540° C.±5° C. in the biomass boiler system; and the superheated steam is transmitted to the turbine and expands in the turbine to drive the generator to generate electricity.

2. The power generation system of claim 1, wherein the waste steam of the turbine is delivered to the condenser and is condensed to be the condensate; the condensate is pressurized by the condensate pump and is transmitted to the first heater in which the condensate is heated and is transmitted to the deaerator to produce the feed water; the feed water output from the deaerator is pumped to the second heater to be heated via the feed water pump; a heating temperature in the second heater is 240° C.±5° C.; the feed water is distributed by a second flow distributor to be two parts: a first part of the feed water is transmitted to the biomass boiler system to produce the biomass steam, and a second part of the feed water is transmitted to the solar thermal boiler system; the second part of the feed water is distributed to be a part A and a part B; the part A is transmitted to the solar thermal heater, and the part B is transmitted to the auxiliary boiler; the first flow distributor is adapted to adjust a flow ratio of part A to part B according to the intensity of the solar energy; the second part of the feed water which enters the solar thermal boiler system is used to produce the mixed steam, and a circulation of working medium is completed.

3. The power generation system of claim 1, wherein a temperature of the heat transfer oil when the heat transfer oil is output from the solar light field is below 380° C.; a temperature of the heat transfer oil when the heat transfer oil returns the storage tank is 280° C.±10° C.

4. The power generation system of claim 2, wherein a temperature of the heat transfer oil when the heat transfer oil is output from the solar light field is below 380° C.; a temperature of the heat transfer oil when the heat transfer oil returns the storage tank is 280° C.±10° C.

5. The power generation system of claim 1, wherein a pressure of the solar thermal steam generated by the solar thermal evaporator is the same as a pressure of the auxiliary steam generated by the auxiliary boiler.

6. The power generation system of claim 2, wherein a pressure of the solar thermal steam generated by the solar thermal evaporator is the same as a pressure of the auxiliary steam generated by the auxiliary boiler.

7. The power generation system of claim 1, wherein the auxiliary steam generated by the auxiliary boiler is complementary with the solar thermal steam generated at the solar thermal evaporator; and an adjustable load range of the auxiliary boiler is between 30% and 100%.

8. The power generation system of claim 2, wherein the auxiliary steam generated by the auxiliary boiler is complementary with the solar thermal steam generated at the solar thermal evaporator; and an adjustable load range of the auxiliary boiler is between 30% and 100%.

9. The power generation system of claim 1, wherein the biomass boiler system is adapted to generate the biomass steam and superheat other saturated steam; the biomass boiler works to achieve 55% of feed water heating and evaporation, and 100% of steam superheating.

10. The power generation system of claim 2, wherein the biomass boiler system is adapted to generate the biomass steam and superheat other saturated steam; the biomass boiler works to achieve 55% of feed water heating and evaporation, and 100% of steam superheating.

11. The power generation system of claim 1, wherein the feed water output from the second heater is distributed by a second flow distributor to be two parts: a first part of the feed water is transmitted to the biomass boiler system, accounting for 55% of the feed water; and a second part of the feed water is transmitted to the solar thermal boiler system, accounting for 45% of the feed water; a flow ratio of the first part to the second part is fixed; the second part of the feed water is then distributed by the first flow distributor to be a part A and a part B; the part A is transmitted to the solar thermal heater, and the part B is transmitted to the auxiliary boiler; the first flow distributor is adapted to adjust a flow ratio of the part A to the part B according to a temperature of the heat transfer oil when the heat transfer oil returns to the storage tank.

12. The power generation system of claim 2, wherein the feed water output from the second heater is distributed by the second flow distributor to be two parts: the first part of the feed water is transmitted to the biomass boiler system, accounting for 55% of the feed water; and the second part of the feed water is transmitted to the solar thermal boiler system, accounting for 45% of the feed water; a flow ratio of the first part to the second part is fixed; the second part of the feed water is then distributed by the first flow distributor to be the part A and the part B; the part A is transmitted to the solar thermal heater, and the part B is transmitted to the auxiliary boiler; the first flow distributor is adapted to adjust the flow ratio of the part A to the part B according to a temperature of the heat transfer oil when the heat transfer oil returns to the storage tank.

* * * * *